(12) United States Patent
Hu et al.

(10) Patent No.: US 10,715,407 B2
(45) Date of Patent: Jul. 14, 2020

(54) DISPATCHER FOR ADAPTIVE DATA COLLECTION

(71) Applicant: QUEST SOFTWARE INC., Aliso Viejo, CA (US)

(72) Inventors: Guangning Hu, Ottawa (CA); Xuejun Situ, Ottawa (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 134 days.

(21) Appl. No.: 15/158,826

(22) Filed: May 19, 2016

(65) Prior Publication Data

US 2017/0339031 A1  Nov. 23, 2017

(51) Int. Cl.
*H04L 12/26* (2006.01)

(52) U.S. Cl.
CPC .......... *H04L 43/04* (2013.01); *H04L 43/0876* (2013.01)

(58) Field of Classification Search
CPC ............................ H04L 43/04; H04L 43/0876
USPC ........................................................ 709/224
See application file for complete search history.

(56) References Cited

U.S. PATENT DOCUMENTS

| | | | | |
|---|---|---|---|---|
| 5,812,780 A * | 9/1998 | Chen | ..................... | G06F 11/261 709/224 |
| 8,131,846 B1 * | 3/2012 | Hernacki | .............. | G06F 21/552 709/224 |
| 2005/0184882 A1 * | 8/2005 | Angelis | .................... | H04Q 9/00 340/870.02 |
| 2008/0243735 A1 * | 10/2008 | Rish | ....................... | G06N 5/003 706/17 |
| 2009/0157870 A1 * | 6/2009 | Nakadai | .................. | G06F 9/505 709/224 |
| 2009/0187899 A1 * | 7/2009 | Mani | ........................ | G06F 8/65 717/168 |
| 2012/0084399 A1 * | 4/2012 | Scharber | ................. | H04L 67/34 709/219 |
| 2012/0296899 A1 * | 11/2012 | Adams | ................... | G16H 10/40 707/736 |

(Continued)

OTHER PUBLICATIONS

Miranda, et al., "An Algorithm for Distributing and Retrieving Information in Sensor Networks", University of Lisbon Portugal, retrieved on Apr. 29, 2016 at <http://www.di.fc.ul.pt/~hmiranda/papers/miranda06e.pdf>, 15 pages.

(Continued)

*Primary Examiner* — Joseph L Greene
(74) *Attorney, Agent, or Firm* — Maschoff Brennan

(57) ABSTRACT

This disclosure describes systems, methods, and computer-readable media for optimizing data collection in a distributed environment by leveraging real-time and historical data collection performance statistics and server performance data. In some configurations, a computing device can be initially configured for data collection. In such configurations, the initial configuration can include preferred target servers for a particular task. The computing device can request batches of data from the preferred target servers, and process the information through a buffer. Techniques and technologies described herein collect the batches of data from servers as well as corresponding data collection statistics (e.g., server performance per task, server historical performance, etc.) and server performance data (e.g. server status).

20 Claims, 5 Drawing Sheets

(56) References Cited

U.S. PATENT DOCUMENTS

| | | | |
|---|---|---|---|
| 2013/0013704 A1* | 1/2013 | Pope | H04L 61/1541 709/206 |
| 2015/0025917 A1* | 1/2015 | Stempora | G06Q 40/08 705/4 |
| 2017/0220623 A1* | 8/2017 | Blount | G06F 12/0269 |

OTHER PUBLICATIONS

Chaudhry, et al., "An Optimal Solution to the Distributed Data Retrieval Problem", Published in Global Telecommunications Conference (GLOBECOM 2010), 2010 IEEE, 2 pages.

\* cited by examiner

DISPATCHER FOR ADAPTIVE DATA COLLECTION

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The collection of large amounts of data in information handling systems, without degrading business activity, is a constant challenge. Many factors may affect the complexity of data collection, such as, for example, the volume of data, environmental complexity, time constraints, and performance limitations. Current solutions for large data collection rely on fixed paths to and retrieval from preferred servers. However, these current solutions may be inefficient and ineffective in a dynamic storage environment.

SUMMARY

This disclosure describes systems, methods, and computer-readable media for optimizing data collection in a distributed environment by leveraging real-time and historical data collection performance statistics and server performance data. In some implementations, a computing device can be initially configured for data collection. In such implementations, the initial configuration can include preferred target servers for a particular task. The computing device can request batches of data from the preferred target servers, and can process the information through a buffer. Techniques and technologies described herein collect the batches of data from servers as well as corresponding data collection statistics (e.g., server performance per task, server historical performance, etc.) and server performance data (e.g. server status).

Example techniques described herein can receive the data collection statistics and server performance data, and can adapt the data collection computing system to environmental changes (e.g., degradation or improvement of server status, increased or decreased performance of a server over time, etc.). Example techniques described herein can apply the performance data feedback and can optimize the data collection process.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
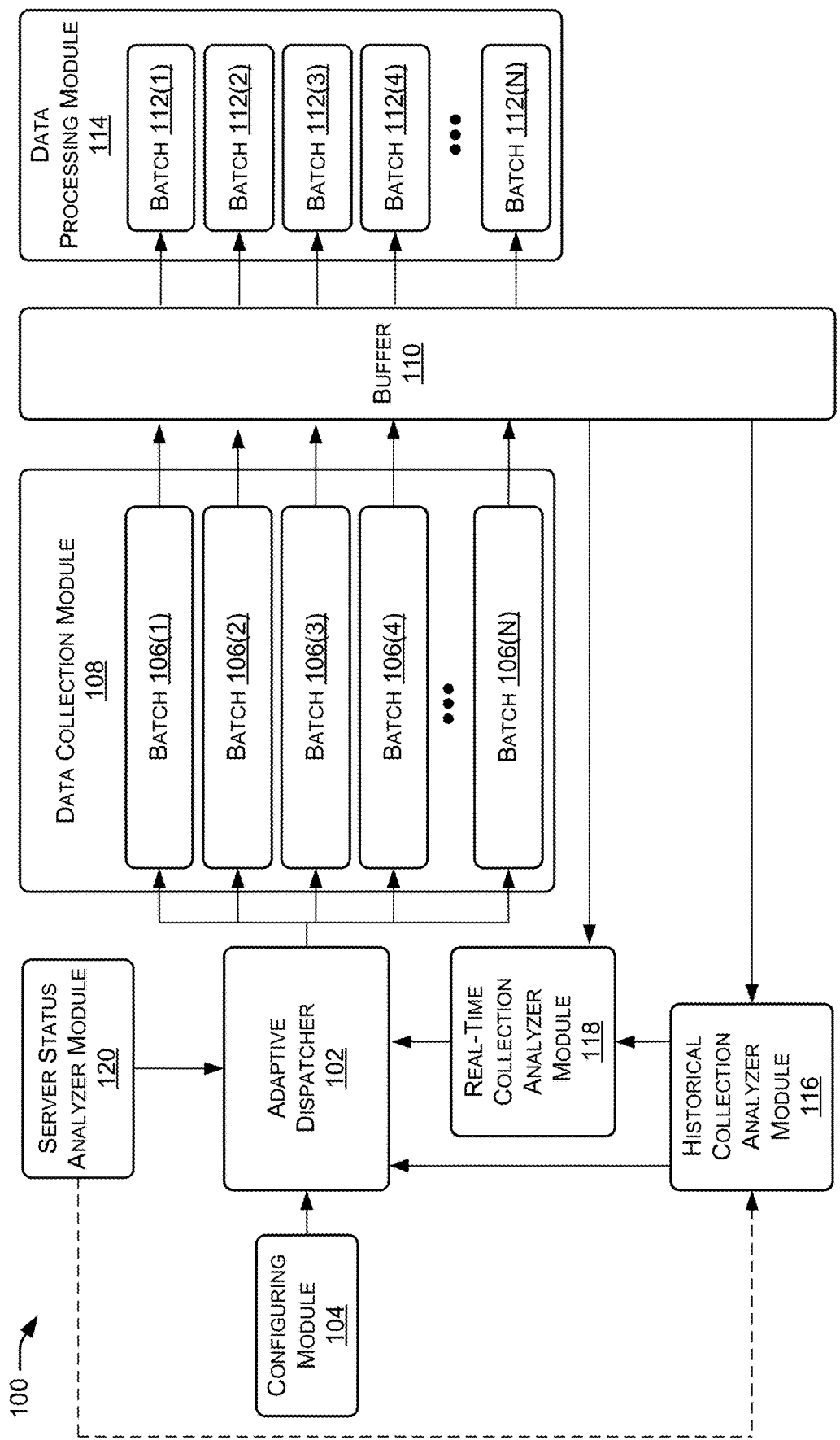
FIG. 1 is a dataflow diagram illustrating components of a computing system to collect data in a data collection optimization system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques are described herein to optimize data collection from one or more computing resources. In various examples, the one or more computing resources can be server computers (e.g., email servers, client access server, network servers, database servers, and the like). In such examples, the server computers can comprise a distributed computing system (e.g., a cloud-based architecture).

In various examples, the data can be collected by a computing system, such as a data collection server. The computing system can include an adaptive dispatcher configured to send data collection requests to the one or more server computers ("servers"). The adaptive dispatcher can receive a task for data collection. In some examples, the task can include batches of data stored on servers, with the data collection endpoints bridging the data collection request to the requested data. For instance, the batches of data can represent data corresponding to a group of mailboxes stored on various mailbox servers. Data collection requests can be sent to various client access servers (e.g., data collection endpoints) to access the data from mailbox servers. In various examples, an adaptive dispatcher algorithm can be configured with initial settings for an initial data collection request. The initial settings can include designated target servers (e.g., servers storing the data). In some examples, the initial settings can be determined by a configuration analyzer. The initial settings can be based on past performance characteristics of the target servers, a known target server status, network latency, the batches of data, or other factors related to a data collection request.

Based on the initial settings, the adaptive dispatcher can request batches of data from data collection endpoints stored on the designated target servers. In various examples, the computing system can include a data collection thread pool (e.g., a data collection module). In such examples, the adaptive dispatcher can generate threads (e.g., sequence of programmed instructions which can be performed independently) in the data collection thread pool (e.g., a number of threads capable of being performed substantially simultaneously), based in part on the requested batches of data. The data collection thread pool can be configured to receive the requested batches of data from the designated target servers, and store the batches of data in the threads. Additionally, the data collection thread pool can be configured to receive data collection statistics corresponding to the stored batches of data.

In various examples, the computing system can include a buffer configured to process the batches of data and corresponding data collection statistics received by the data collection thread pool. The buffer can separate the batches of data, and send the batches of data to a processing thread pool (e.g., processing module) for analysis. Additionally, the buffer can deliver the data collection statistics to a historical collection analyzer and/or a real-time collection analyzer. The historical collection analyzer can be configured to store data collection history for particular servers, and to analyze (e.g., using machine learning) data collection statistics. Based on the stored history and the analysis, the historical collection analyzer can predict future performance statistics for particular servers and can predict efficient target servers for new tasks based on historical trends. The real-time collection analyzer can be configured to analyze the performance of a completed task (e.g., a batch of data collected from a server) in real-time, and can provide the performance data to the adaptive dispatcher.

In various examples, the adaptive dispatcher can receive historical data from the historical collection analyzer and/or real-time data from the real-time collection analyzer. Based on the received data, the adaptive dispatcher can determine one or more target servers to which the adaptive dispatcher will assign a subsequent task.

Additionally or alternatively, the adaptive dispatcher can determine the one or more target servers for subsequent tasks based on the status of target servers. In various examples, the computing device can include a server status analyzer (e.g., server status module) configured to monitor server performance status and critical resources (e.g., CPU usage, memory usage, disk input/output, network traffic, software constraints, hardware constraints, etc.) for potential target servers. In such examples, the server status analyzer can provide the server status information to the adaptive dispatcher to determine the one or more target servers.

The data collection system described herein can optimize data collection in a distributed environment by leveraging real-time and historical data collection performance statistics and server performance data. Because the data collection system can be continually adjusted based on data collection performance statistics and/or server performance, the actual functioning of the computing system can be improved, in that the computing system is able to process more information at a higher rate than it otherwise would be able to. Additionally, due to system updates, the data collection system described herein can prevent server system overloads, unnecessary delays in data transmission, multiple requests for the same information, etc. Therefore, the data collection system can improve the technology or technical field of network performance, server performance, and the like.

FIG. 1 is a dataflow diagram illustrating components 100 of a computing system to collect data in a data collection optimization system. In various examples, the computing system can include an adaptive dispatcher 102. The adaptive dispatcher 102 can process one or more tasks for data collection. In some examples, the one or more tasks can be generated by a program manager configured to determine tasks based on data required to accomplish a data collection goal. In such examples, the program manager can be internal or external (e.g., input tasks via an input/output device) to the computing system. In various examples, the adaptive dispatcher 102 can be the program manager, and can be configured to generate tasks based on a pre-defined data collection goal. For example, the computing system can have the pre-defined data collection goal of determining statistics related to each mailbox in a group of mailboxes. The adaptive dispatcher 102 can receive the pre-defined data collection goal, and determine the tasks required to accomplish the goal.

In various examples, the adaptive dispatcher 102 can be initially configured for task and/or goal accomplishment. In some examples, the adaptive dispatcher 102 can be initially configured by a configuring module 104. In some examples, the initial configuration can include initial settings for an adaptive dispatcher algorithm. In such examples, the initial configuration can include initial parameter settings in the adaptive dispatcher algorithm.

In various examples, the initial configuration can include batches of data 106 for collection. In such examples, the configuring module 104 can create one or more batches (e.g., groups) of data related to data collection endpoints and provide the batches of data 106 to the adaptive dispatcher 102 for processing. The configuring module 104 can generate the batches of data 106 based on similarities between the data to be collected, such as a shared server storing the batched data, a shared geographical region of the data, a shared sub-section (e.g., department) in a business, etc. Using the mailbox example from above, with a group of 200,000 mailboxes, the configuring module 104 can batch (e.g., group) relevant mailboxes stored by a particular server to create a match of mailboxes. Therefore, a data collection request to the corresponding server may not require the server to filter through the data collection request to determine mailboxes statistics for a group of mailboxes saved to the server. Instead, the server can quickly process the data, thereby speeding up the data collection process. As another example, the group of 200,000 mailboxes can be mailboxes of employees of a company. The configuring module 104 can batch the mailboxes assigned to each sub-section (e.g., department) of the company, such as, for example, in batches of 500 employees. Therefore, the batched requests may have a decreased impact on the identified servers than a request for data from the entire group of 200,000.

In some examples, the initial configuration can include designated target servers (e.g., servers storing data). The designated target servers can be the initial set of servers storing batched data from which the adaptive dispatcher 102 will request data. The designated target servers can be identified based on past performance characteristics of the target servers, a known target server status, network latency, the batches of data, or other factors related to a data collection request.

After the adaptive dispatcher 102 has been initially configured, such as by the configuring module 104, the adaptive dispatcher 102 can request batches of data 106 from data collection endpoints stored on the designated target servers. The computing system can include a data collection module 108 (e.g., a data thread pool). In some examples, the adaptive dispatcher 102 can generate threads in the data collection module 108, based in part on the requested batches of data 106(1)-106(N). The data collection module 108 can be configured to receive the requested batches of data 106 from the designated target servers, and store the batches of data 106(1)-106(N) in the threads. Additionally, the data collection module 108 can be configured to receive data collection statistics (e.g., time to collect requested data, completion of the data request, etc.) corresponding to the batches of data 106.

The computing system can include a buffer 110 configured to process collected data and corresponding data collection statistics received by the data collection module 108. The buffer 110 can separate the batched results 112(1)-112(N), and send the batched results 112 to a processing module 114 (e.g., processing thread pool) for analysis. In some examples, the computing system can generate threads in the processing module 114, based in part on the requested batches of data 106(1)-106(N) and/or the batched results 112(1)-112(N).

Additionally, the buffer 110 can deliver the data collection statistics to a historical collection analyzer module 116 and/or a real-time collection analyzer 118. The historical collection analyzer module 116 can be configured to store data collection history for particular servers, and to analyze data collection statistics. Based on the stored history and the analysis, the historical collection analyzer module 116 can predict future performance statistics for particular servers and can predict efficient target servers for new tasks based on historical trends. The historical collection analyzer module 116 can combine server performance P, defined as $P=\{P_i\}$, where i is an index of the source server (e.g., server containing requested data), and a source server status provided by a server status analyzer module 120 to generate a server forecast data model M, defined as $M=\{M_i\}$. For the ith source server, the forecast model $M_i$ can be defined as follows:

$$M_i = HS(S_i, T_i, MT_i, W_i, P_i) \quad (1)$$

where Si is the identifier of the ith source server, MTi is the metadata of Si at the timestamp Ti. In other words, the historical collection analyzer module 116 forecasts future values for a source server Si by using a series of historical weight factors Wi and server performance Pi from Si. One or more of the modules 116, 118, or 120 may be implemented using a machine learning algorithm, such as a support vector machine etc.

The real-time collection analyzer module 118 can be configured to analyze the performance of a completed task (e.g., a batched result 112 collected from a server) in real-time, and can provide the performance data to the adaptive dispatcher 102. In various examples, the real-time collection analyzer module 118 collects metadata of real-time data retrieval and calculates a weight factor $W_i$ with a timestamp $T_i$ after each data collection thread ends. The real-time performance $P_i$ can be stored for historical analysis. The real-time performance can be illustrated as $P_i=\{S_i, T_i, W_i\}$, where i is an index of the source server. For the ith source server, the weight factor function can be defined as follows:

$$W_i = RT(S_i, T_i, MT_i) \quad (1)$$

In various examples, the adaptive dispatcher 102 can receive historical data from the historical collection analyzer module 116 and/or real-time data from the real-time collection analyzer module 118. Based on the received data, the adaptive dispatcher 102 can determine one or more servers to which the adaptive dispatcher 102 will assign a subsequent task.

Additionally or alternatively, the adaptive dispatcher 102 can determine the one or more target servers for subsequent tasks based on the status of servers. In various examples, the computing device can include the server status analyzer module 120 (e.g., server status module) configured to monitor server performance status and critical resources (e.g., CPU usage, memory usage, disk input/output, network traffic, software restraints, hardware restraints, etc.) for the servers storing data related to the task. In such examples, the server status analyzer module 120 can provide the server status information (e.g., maintenance mode, available, overloaded, busy, etc.) to the adaptive dispatcher 102 to determine the one or more servers.

Thus, the adaptive dispatcher 102 can receive input from the historical collection analyzer module 116, real-time collection analyzer module 118 and/or the server status analyzer module, and can automatically adapt to environmental changes with respect to servers (e.g., changes in server availability, efficiency, speed, network latency, etc.). Additionally, the adaptive dispatcher 102 can build a foundation for performance optimization over time. Based on the automatic adaptation, the adaptive dispatcher 102 can improve the functioning of the computing system in requesting data from servers due in part to the increased efficiency in operation. Additionally, the adaptive dispatcher 102 can increase the bandwidth available for other processes, as it can limit requests of data to servers that are properly functioning and/or available, thereby decreasing the number of data requests sent over the network.

Figure 2:
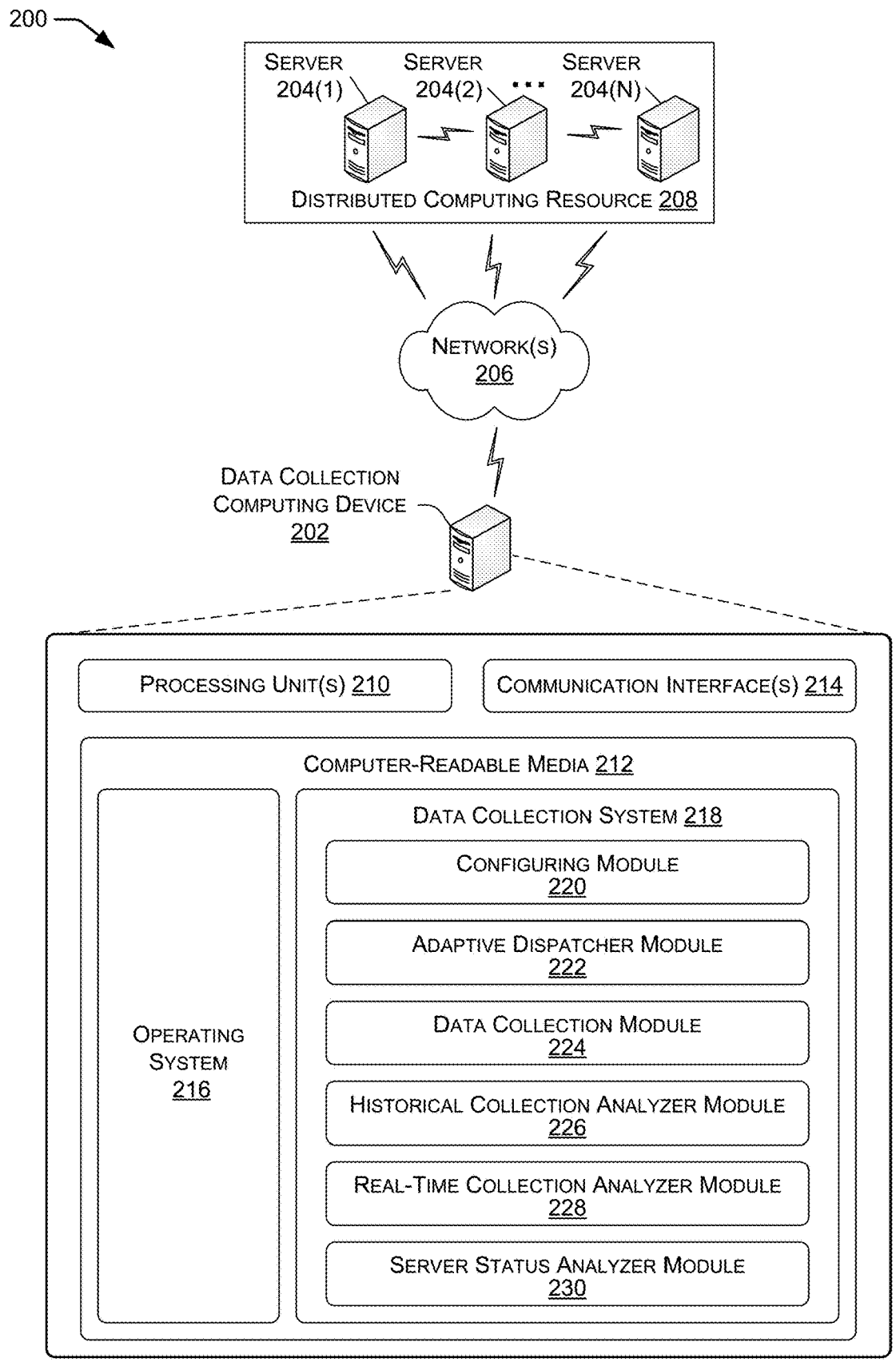
FIG. 2 is a block diagram illustrating an example environment for the data collection optimization system.

FIG. 2 is a block diagram illustrating an example environment 200 for the data collection optimization system. In various examples, a data collection computing device 202, which can be the computing system described in FIG. 1, can request data from one or more server(s) 204 (e.g., source servers) via one or more network(s) 206. The one or more server(s) 204 can be configured to communicate with one another in a distributed computing resource 208 via the one or more network(s) 206.

In various examples, network(s) 206 can include public networks such as the Internet, private networks such as an institutional and/or personal intranet, or some combination of private and public networks. Network(s) 206 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 206 can utilize communications protocols, including packet-based and/or datagram-based protocols such as internet protocol (IP), transmission control protocol (TCP), user datagram protocol (UDP), or other types of protocols. Moreover, network(s) 206 can also include a number of devices that facilitate network communications and/or form a hardware basis for the networks, such as switches, routers, gateways, access points, firewalls, base stations, repeaters, backbone devices, and the like.

In some examples, network(s) 206 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

As discussed above, the data collection computing device 202 can request data from server(s) 204 based on an adaptive dispatcher's algorithm. The data collection computing device 202 can include any type of computing device having one or more hardware processing unit(s) 210 operably connected to a computer readable media (CRM) 212 such as via a bus, which in some instances can include one or more of a system bus, a data bus, an address bus, a PCI bus, a Mini-PCI bus, and any variety of local, peripheral, and/or independent buses. The data collection computing device 202 can also include one or more communication interfaces 214 to enable communications between data collection computing device 202 and other networked devices, such as the one or more server(s) 204.

CRM 212 can include non-transitory computer storage media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a data collection computing device 202.

Executable instructions stored on CRM 212 can include, for example, an operating system 216, a data collection system 218, and other modules, programs, or applications that are loadable and executable by processing units(s) 210. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU embedded in an FPGA fabric.

The data collection system 218, which can be data collection system 100, can include a configuring module 220, which, in some cases, can be configuring module 104. The configuring module 104 can establish an initial configuration for the adaptive dispatcher module 222, which can be adaptive dispatcher 102. In various examples, the initial configuration can be determined based on the data collection system 218 task and/or goal accomplishment. In such examples, the initial configuration can include batches of data collection endpoints for collection. The configuring module 220 can batch the data required for task and/or goal accomplishment, and can provide the batches of data collection endpoints to the adaptive dispatcher 222 for processing.

The configuring module 220 can generate the batches of data collection endpoints based on similarities between the data to be collected, such as a shared server storing the batched data, a shared region of the data, a shared subsection (e.g., department) in a business, etc. For example, a data collection system may have a goal of collecting statistics with respect to a group of 400,000 mailboxes in a 24-hour period. Based on the goal, the configuring module 220 can batch relevant mailboxes (e.g., data collection endpoints) stored by a particular server. For another example, the group of 400,000 mailboxes can be mailboxes of employees of a company. The configuring module 220 can batch the mailboxes assigned to each department of the company, such as, for example, in batches of 500 employees.

In some examples, the initial configuration can include designated target servers (e.g., servers storing batches of data collection endpoints). The designated target servers can be the initial set of servers storing batched data from which the adaptive dispatcher 222 will request data. The designated target servers can be identified based on past performance characteristics of the target servers, a known target server status, network latency, the batches of data, batches of data collection endpoints or other factors related to a data collection request.

After the adaptive dispatcher 222 has been initially configured, the adaptive dispatcher 222 can request batches of data from the data collection endpoints stored in designated target servers. In various examples, the computing system can include a data collection module 224 (e.g., a data thread pool). In some examples, the adaptive dispatcher 222 can generate threads in the data collection module 224, based in part on the data required for task and/or goal accomplishment. The data collection module 224 can be configured to receive the requested batches of data from the designated target servers, and store the batches of data in the threads. Additionally, the data collection module 224 can be configured to receive data collection statistics (e.g., time to collect requested data, completion of the data request, etc.) corresponding to the batches of data.

In various examples, the data collection system 218 can include a buffer configured to process collected data and corresponding data collection statistics received by the data collection module 224. In some examples, the buffer can be an element of the data collection module 224. The buffer can separate the batched results, and send the batched results to a processing module for analysis. Additionally, the buffer can deliver the data collection statistics to a historical collection analyzer module 226 and/or a real-time collection analyzer module 228.

The historical collection analyzer module 226 can be configured to store data collection history for particular servers, and to analyze data collection statistics. Based on the stored history and the analysis, the historical collection analyzer module 226 can predict future performance statistics for particular servers and can predict efficient target servers for new tasks based on historical trends. The historical collection analyzer module 226 can combine server performance and a source server status provided by the server status analyzer module 230 to generate a server forecast data model for the relevant servers.

The real-time collection analyzer module 228 can be configured to analyze the performance of a completed task (e.g., a batched result collected from a server) in real-time, and can provide the performance data to the adaptive dispatcher module 222. In various examples, the real-time collection analyzer module 228 collects metadata of real-time data retrieval and calculates a weight factor with respect to time after each data collection thread ends. The real-time collection analyzer module 228 can determine a real-time performance based on the metadata and time required to collect the data from the server.

In various examples, the adaptive dispatcher module 222 can receive historical data from the historical collection analyzer module 226 and/or real-time data from the real-time collection analyzer module 228. Based on the received data, the adaptive dispatcher 222 can determine one or more servers to which the adaptive dispatcher 222 will assign a subsequent data request.

Additionally or alternatively, the adaptive dispatcher 222 can determine the one or more target servers for subsequent data requests based on the status of servers. The adaptive dispatcher 222 can determine the status of servers based on input from the server status analyzer module 230. The server status analyzer module 230 can be configured to monitor server performance status and critical resources (e.g., CPU usage, memory usage, disk input/output, network traffic, software restraints, hardware restraints, etc.) for the servers storing data related to the task. In such examples, the server status analyzer module 230 can provide the server status information (e.g., maintenance mode, available, overloaded, busy, etc.) to the adaptive dispatcher 222 to determine the one or more servers. In various examples, the server status analyzer module 230 can monitor the servers periodically, at pre-determined intervals. In some examples, the server status analyzer module can monitor the servers when instructed by a program manager, the adaptive dispatcher module 222, or other entity internal or external to the data collection computing device 202.

Figure 3:
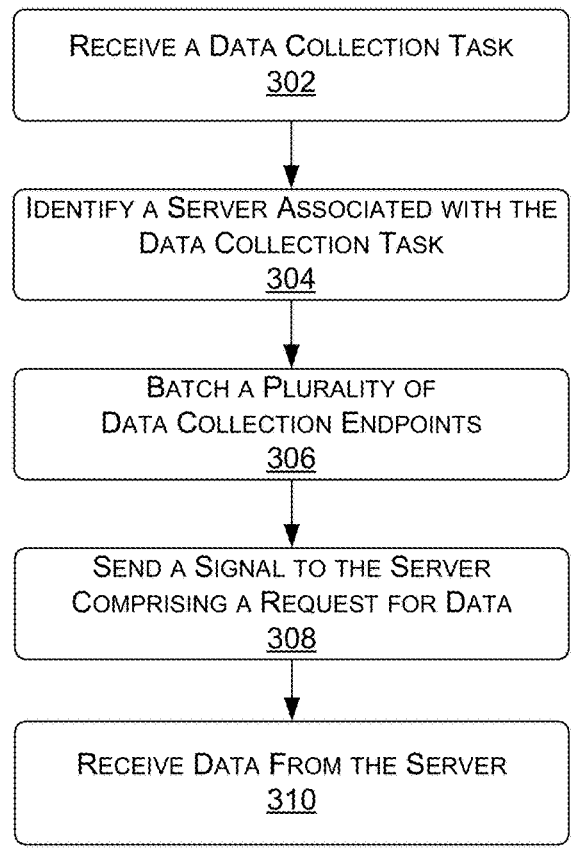
FIG. 3 is a flow diagram that illustrates a process flow of initializing a data collection system and collecting data based on the initialization.
Figure 4:
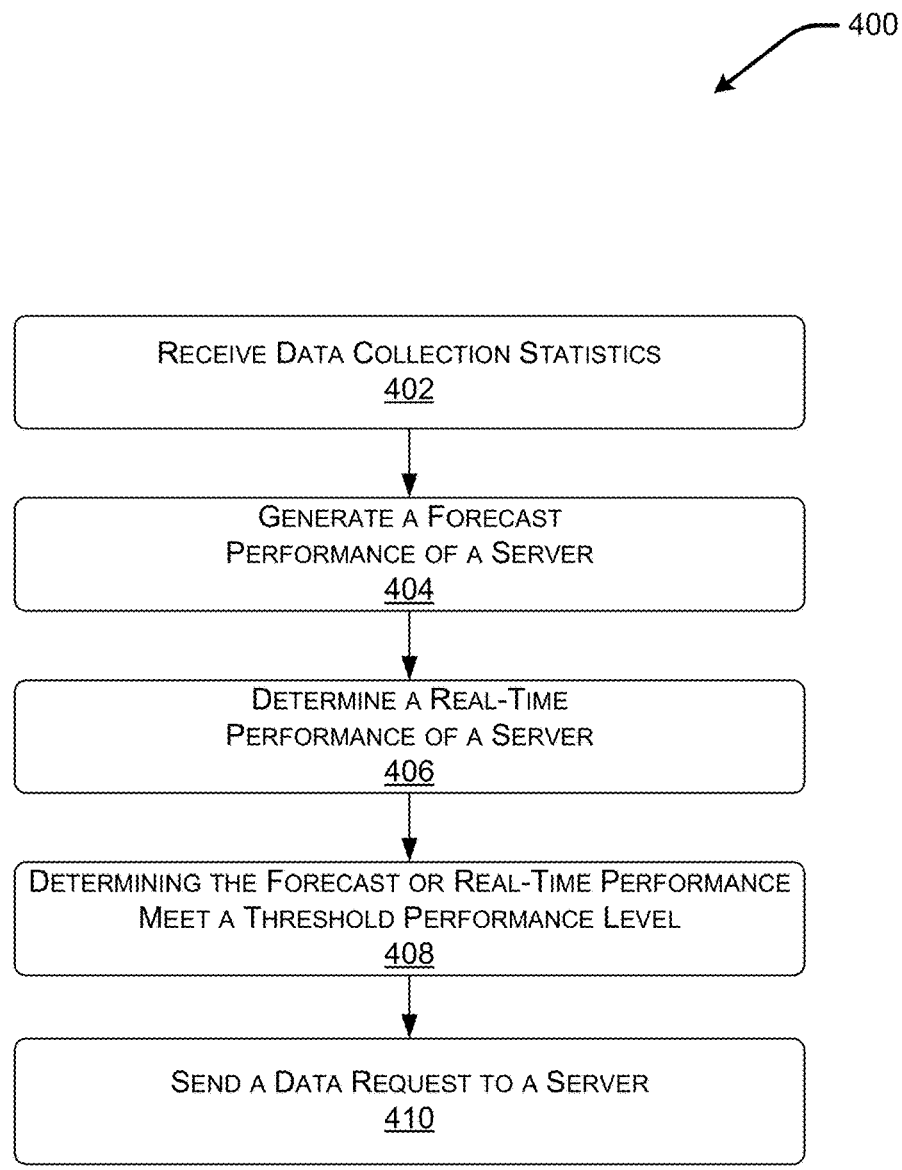
FIG. 4 is a flow diagram that illustrates a process flow of adjusting a data collection system based on data collection statistics to provide efficient data collection.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2 as described above, although other models, frameworks, systems and environments may implement these processes.

FIG. 3 is a flow diagram that illustrates a process flow 300 of initializing a data collection system and collecting data based on the initialization. The process flow 300 may be performed by the configuring module 104 and the adaptive dispatcher 102 of FIG. 1.

At 302, a computing device, such as data collection computing device 202, receives a data collection task. In some examples, the task can be generated by a program manager configured to determine tasks based on data required to accomplish a data collection goal. In such examples, the program manager can be internal or external (e.g., input tasks via an input/output device) to the computing device. For example, in FIG. 2, the adaptive dispatcher module 222, can be the program manager, and can be configured to generate tasks based on a pre-defined data collection goal. For example, in FIG. 2, the computing device 202 can have the pre-defined data collection goal of determining statistics related to each mailbox in a group of mailboxes, such as a group of mailbox stored on the distributed computing resource 208. The adaptive dispatcher module 222 can receive the pre-defined data collection goal, and determine the tasks required to accomplish the goal.

At 304, the computing device 202 identifies a server, such as server 204 of FIG. 2, associated with the data collection task. The server 204 can be identified based on data stored on the server, such as at a data collection endpoint (e.g., a particular data store containing the requested data). In various examples, the computing device 204 can determine a plurality of servers associated with the data collection task. The plurality of servers can be part of a distributed computing system, such as distributed computing system 208.

At 306, the computing device 202 batches a plurality of data collection endpoints. For example, in FIG. 1, the batching can be based on one or more similarities between the data collection endpoints, such as a shared server storing the batched data, a shared region of the data, a shared department in a business, etc. In various examples, the batches 106 can be of a pre-defined size, for ease of batching. For example, the batches of data collection endpoints can be batches of 300 data collection endpoints. In other examples, the batches of data collection endpoints can be larger or smaller. Additionally or alternatively, the batches of data collection endpoints can be based on one or more similarities shared by the batched data collection endpoints. For example, the computing device can batch the data collection endpoints that share a same department in a company. As such, the data collection endpoints for an operations department can be batched together, as well as a maintenance department, etc.

At 308, the computing device 202 can send a signal to the server comprising a request for data. In various examples, the signal requesting data can be sent by the adaptive dispatcher module 222 in the computing device 202.

At 310, the computing device can receive data from the server. The computing device can send the data to a data processing module, such as data processing module 114, for further analysis. For example, in FIG. 2, the data collection computing device 202 can receive data collection statistics substantially concurrently with the data. In such examples, the data collection statistics can be sent to a historical collection analyzer module 226 and/or a real-time collection analyzer module 228 for analysis of the server performance. In some examples, the historical collection analyzer module 226 and/or a real-time collection analyzer module 228 can provide server performance data to the adaptive dispatcher module 222 for subsequent data requests.

FIG. 4 is a flow diagram that illustrates a process flow 400 of updating an adaptive dispatcher of a data collection system to provide efficient data collection. In various examples, the updating can include training one or more parameters of an adaptive dispatcher algorithm.

At 402, the computing device, such as data collection computing device 202 receives data collection statistics from a server, such as server 204 of FIG. 2. The data collection statistics can include performance statistics of a particular server from which the computing system requests data. Performance statistics can include a time to collect requested data, completion of the data request, and the like. In some examples, the data collection statistics can be processed by a historical collection analyzer and a real-time collection analyzer of the computing device, such as historical collection analyzer module 226 and a real-time collection analyzer module 228 of data collection computing device 202.

At 404, the computing device 202 can generate a forecast performance of a server 204. In various examples, a historical collection analyzer module 226 of the computing device 202 can analyze the data collection statistics received at 402, as well as stored historical data of the server, to determine the historical performance of the server. Based on the stored history and the analysis, the historical collection analyzer module 226 can predict future performance statistics for particular servers and can predict efficient target servers 204(1)-204(N) for new tasks based on historical trends. The historical collection analyzer module 226 can combine server performance and a source server status provided by a server status analyzer module, such as server status analyzer module 230 to generate a forecast performance of the server.

At 406, the computing device 202 can determine a real-time performance of a server 204. In various examples, a real-time collection analyzer module 228 can receive the data collection statistics at 402, and can analyze the performance of a completed task (e.g., a data collected from a server) in real-time. In such examples, the real-time collection analyzer module 228 can collect metadata of real-time data retrieval and can calculate a time-stamped weight factor after each data collection thread ends.

At 408, the computing device 202 can determine that the forecast performance of the server and/or the real-time performance of the server meet a threshold performance level. The threshold performance level can be a pre-defined minimum performance required of the server to efficiently collect data therefrom. In various examples, the computing device can update an adaptive dispatcher, such as adaptive dispatcher module 222, based at least in part on a determination that the generated forecast performance of the server and/or the determined real-time performance of the server fail to meet the threshold performance level. In such examples, the computing device 202 can update the data collection system by updating an adaptive dispatcher algorithm.

At 410, the computing device 202 can send a data request to a server 204. Responsive to the determination that the generated forecast performance or real-time performance of the server meet the threshold performance level, the computing device can send the data request to the server. Thus, the computing device can limit data requests to available and/or efficient servers. Due to the automatic adaptation of the data collection system to environmental changes with respect to servers (e.g., changes in server availability, efficiency, speed, network latency, etc.), the data collection system can optimize data performance over time. As such, the data collection system can improve the functioning of the computing device itself, by requesting data from servers due in part to the increased efficiency in operation. Additionally, the data collection system can improve the available bandwidth available for other processes, as it can limit requests of data to servers that are properly functioning and/or available, thereby decreasing the number of data requests sent over the network.

Figure 5:
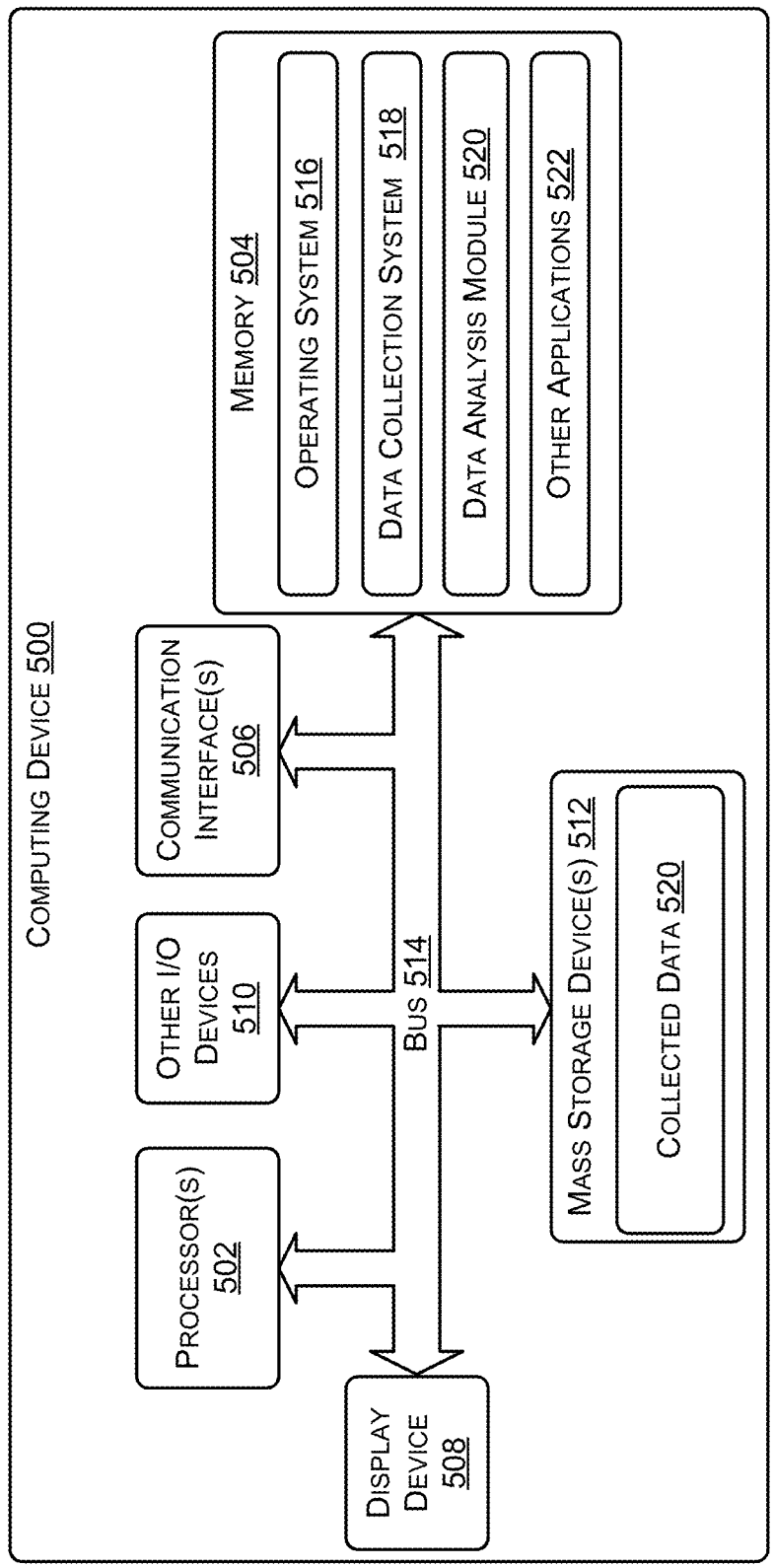
FIG. 5 illustrates an example configuration of a computing device that can be used to implement the systems and techniques described herein.

FIG. 5 illustrates an example configuration of a computing device 500 that can be used to implement the systems and techniques described herein. The computing device 500 may include one or more processors 502, a memory 504, communication interfaces 506, a display device 508, other input/output (I/O) devices 510, and one or more mass storage devices 512, configured to communicate with each other, such as via a system bus 514 or other suitable connection.

The processor 502 is a hardware device (e.g., an integrated circuit) that may include one or more processing units, at least some of which may include single or multiple computing units or multiple cores. The processor 502 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 502 can be configured to fetch and execute computer-readable instructions stored in the memory 504, mass storage devices 512, or other internal and/or external computer-readable media.

Memory 504 and mass storage devices 512 are examples of computer storage media (e.g., memory storage devices) for storing instructions which are executed by the processor 502 to perform the various functions described above. For example, memory 504 may generally include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a media capable of storing computer-readable, processor-executable program instructions as computer program code that can be executed by the processor 502 as a particular machine configured for carrying out the operations and functions described in the implementations herein.

The computing device 500 may also include one or more communication interfaces 506 for exchanging data (e.g., via the network 208 of FIG. 2). The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 506 can also provide communication with external storage (not shown), such as in a storage array, network attached storage, storage area network, or the like.

A display device 508, such as a monitor may be included in some implementations for displaying information and images to users. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store an operating system 516, the data collection system 518, which can be data collection system 202, a data analysis module 520, other applications 522, and collected data gathered by the data collection system 518.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   receiving a data collection task;
   identifying a group of data collection endpoints associated with the data collection task;
   receiving, by a computing device, data collection statistics related to a server associated with the group of data collection endpoints;
   generating a forecast performance of the server;
   determining a real-time performance of the server by collecting metadata of real-time data retrieval and calculating a weight factor with a timestamp for the data collection task, wherein the weight factor is associated with a first performance of the server during the data collection task;
   determining that one or more of the forecast performance or the real-time performance of the server satisfy a threshold level of performance;
   sending a data request associated with the data collection task to the server associated with the group of data collection endpoints;
   continuing to receive data collection statistics related to the server associated with the group of data collection endpoints;
   determining an updated forecast performance of the server including calculating a second weight factor for a second data collection task, wherein the second weight factor is associated with a second performance of the server during the second data collection task, wherein the updated forecast performance of the server is calculated using a series of historical weight factors correlated to historical server performance, wherein the series of historical weight factors include the first weight factor and the second weight factor, wherein the historical server performance includes the first performance of the server and the second performance of the server;
   determining, in view of the second weight factor, that the updated forecast performance of the server does not satisfy the threshold level of performance; and
   refraining from sending a future data request to the server.

2. The computer-implemented method of claim 1, wherein the forecast performance of the server is based at least in part on one or more of:
   a status of the server; or
   a historical performance of the server.

3. The computer-implemented method of claim 1, wherein the group of data collection endpoints are grouped based at least in part on a shared characteristic of each data collection endpoint of the group of data collection endpoints.

4. The computer-implemented method of claim 3, wherein the shared characteristic comprises one or more of:
the server storing the group of data collection endpoints;
a region in which the group of data collection endpoints is stored; or
a sub-section of a company to which the data collection endpoints are associated.

5. The computer-implemented method of claim 1, wherein the forecast performance and the real-time performance of the server are based at least in part on data collection statistics related to the server.

6. The computer-implemented method of claim 1, wherein the server is a first server of a plurality of servers in a distributed computing resource.

7. A device comprising:
an adaptive dispatcher configured to:
receive a data collection task;
identify a group of data collection endpoints associated with the data collection task;
request data from a server associated with the group of data collection endpoints based on data collection task;
an historical collection analyzer module configured to:
receive data collection statistics;
receive a server status;
generate a forecast performance of the server; and
send the forecast performance of the server to the adaptive dispatcher; and
a real-time collection analyzer module configured to:
receive the data collection statistics;
determine a real-time performance of the server by collecting metadata of real-time data retrieval and calculating a weight factor with a timestamp for the data collection task, wherein the weight factor is associated with a first performance of the server during the data collection task;
send the real-time performance of the server to the adaptive dispatcher,
wherein the adaptive dispatcher is configured to send a data request associated with the data collection task to the server associated with the group of data collection endpoints based at least in part on one or more of the forecast performance of the server or the real-time performance of the server;
continue to receive data collection statistics related to the server associated with the group of data collection endpoints; and
send the real-time performance of the server to the adaptive dispatcher, wherein the adaptive dispatcher is configured to:
determine an updated forecast performance of the server by calculating a second weight factor for a second data collection task, wherein the second weight factor is associated with a second performance of the server during the second data collection task, wherein the updated forecast performance of the server is calculated using a series of historical weight factors correlated to historical server performance, wherein the series of historical weight factors include the first weight factor and the second weight factor, wherein the historical server performance includes the first performance of the server and the second performance of the server;

determine, in view of the second weight factor, that the updated forecast performance of the server does not satisfy the threshold level of performance; and
refrain from sending a future data request to the server.

8. The device of claim 7, further comprising:
a configuring module configured to:
identify the server associated with a data collection task;
group two or more data collection endpoints based on the data collection task; and
establish initial settings for the adaptive dispatcher.

9. The device of claim 7, further comprising:
a buffer configured to:
receive batches of data and corresponding data collection statistics;
send the batches of data to a data processing module; and
send the data collection statistics to the historical collection analyzer module and the real-time collection analyzer module.

10. The device of claim 7, further comprising:
a server status analyzer module configured to receive the server status from the server and send the server status to one or more of the historical collection analyzer module or the adaptive dispatcher.

11. The device of claim 10, wherein the server status comprises one or more of:
server performance status;
CPU usage;
memory usage of the server;
network traffic related to the server;
software restraints on the server; or
hardware restraints on the server.

12. The device of claim 7, further comprising a data collection module configured to receive batches of data and corresponding data collection statistics from the server and store the batches of data and the corresponding data collection statistics.

13. A data collection system, comprising:
a processor; and
a non-transitory computer-readable medium coupled to the processor and having instructions stored thereon that, when executed by the processor, cause the processor to perform operations comprising:
receive a data collection task;
identify a group of data collection endpoints associated with the data collection task;
receive data collection statistics from a server associated with the group of data collection endpoints;
generate a forecast performance of the server based at least in part on the data collection statistics;
determine a real-time performance of the server based at least in part on the data collection statistics by collecting metadata of real-time data retrieval and calculating a weight factor with a timestamp for the data collection task, wherein the weight factor is associated with a first performance of the server during the data collection task;
determine that at least one of the forecast performance or the real-time performance of the server meet a threshold performance level;
send a data request associated with the data collection task to the server associated with the group of data collection endpoints based at least in part on the forecast performance of the server or the real-time performance of the server;

continue to receive data collection statistics related to the server associated with the group of data collection endpoints;

determine an updated forecast performance of the server by calculating a second weight factor for a second data collection task, wherein the second weight factor is associated with a second performance of the server during the second data collection task, wherein the updated forecast performance of the server is calculated using a series of historical weight factors correlated to historical server performance, wherein the series of historical weight factors include the first weight factor and the second weight factor, wherein the historical server performance includes the first performance of the server and the second performance of the server;

determine, in view of the second weight factor, that the updated forecast performance of the server does not satisfy the threshold level of performance; and refrain from sending a future data request to the server.

14. The data collection system of claim 13, wherein the forecast performance of the server is further based at least in part on one or more of:

a status of the server; or a historical performance of the server.

15. The data collection system of claim 13, wherein the group of data collection endpoints are grouped based at least in part on a shared characteristic of each data collection endpoint of the group of data collection endpoints.

16. The data collection system of claim 15, wherein the shared characteristic comprises one or more of:

the server storing the group of data collection endpoints;

a region in which the group of data collection endpoints is stored; or a sub-section of a company to which the data collection endpoints are associated.

17. The data collection system of claim 13, wherein the forecast performance and the real-time performance of the server are based at least in part on data collection statistics related to the server.

18. The data collection system of claim 13, wherein the data request is sent to a second server based at least in part on the forecast performance and the real-time performance of the server not meeting the threshold performance level.

19. The computer-implemented method of claim 1, wherein the weight factor is associated with a timestamp.

20. The device of claim 7, wherein the weight factor is associated with a timestamp.

* * * * *